N. FRYE.
DRIVE GEARING.
APPLICATION FILED OCT. 26, 1908.

926,557.

Patented June 29, 1909.
2 SHEETS—SHEET 1.

Witnesses

Inventor
Norman Frye,
by Victor J. Evans
Attorney

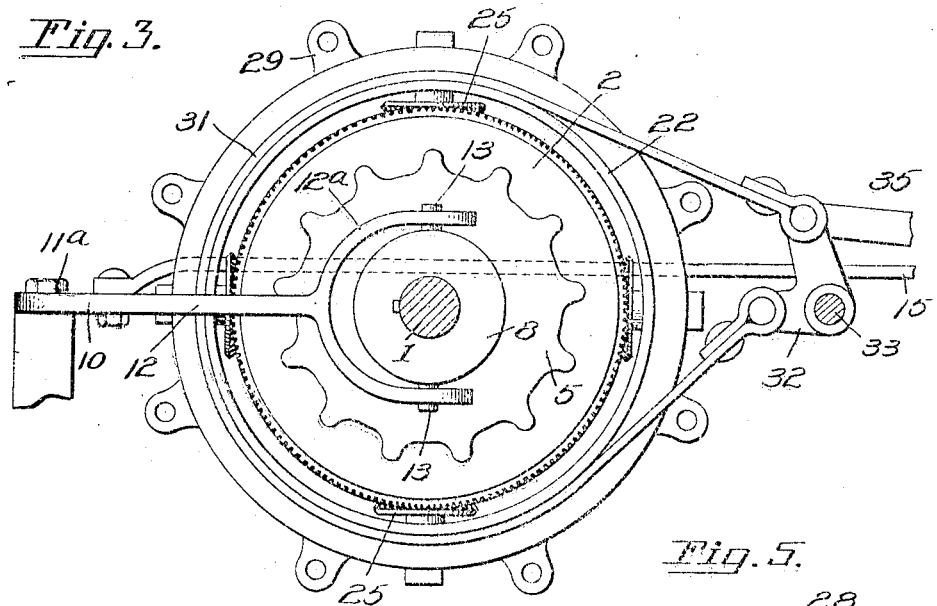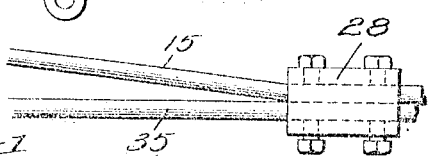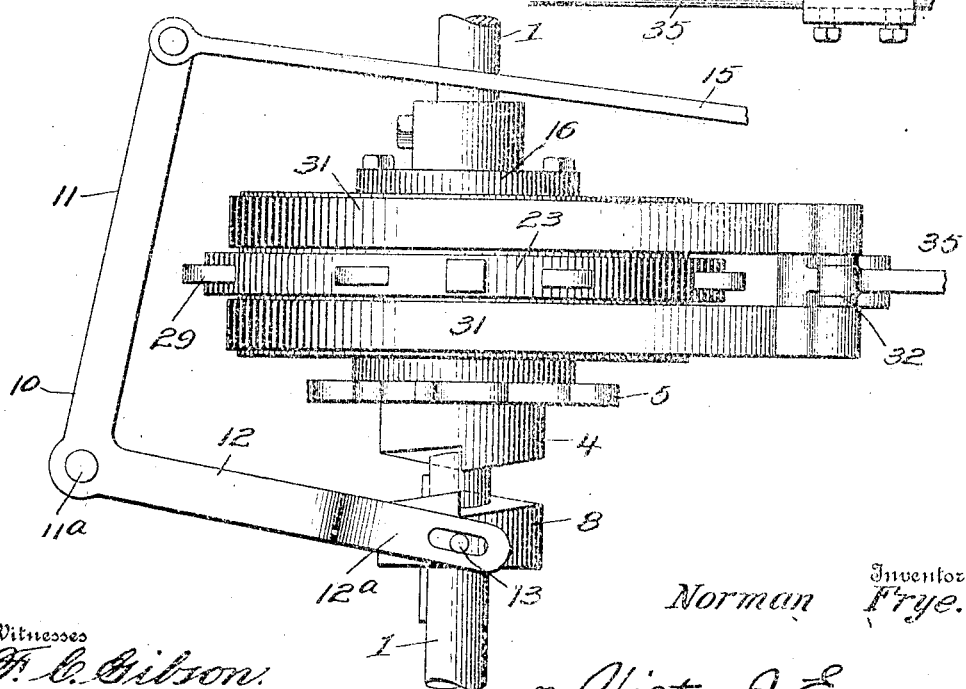

UNITED STATES PATENT OFFICE.

NORMAN FRYE, OF LINCOLN, KANSAS.

DRIVE-GEARING.

No. 926,557.  Specification of Letters Patent.  Patented June 29, 1909.

Application filed October 26, 1908.  Serial No. 459,627.

*To all whom it may concern:*

Be it known that I, NORMAN FRYE, a citizen of the United States, residing at Lincoln, in the county of Lincoln and State of Kansas, have invented new and useful Improvements in Drive-Gearing, of which the following is a specification.

This invention relates to certain new and useful improvements in drive gearing, and one of its objects is to provide a drive gearing which may be reversed in action to reverse the direction of motion of the driven element without reversing the direction of motion of the driving element.

Another object of the invention is to provide a drive gearing of this character, the principal elements of which may be also employed as a differential or compensating gearing.

Still another object is to provide a gearing in which the parts are readily disconnectible for repairs or the substitution of new parts, and for varying the character of the gearing as above described.

With these and other objects in view, the invention consists of the features of construction, combination and arrangement of parts hereinafter fully described and claimed, reference being had to the accompanying drawing, in which:—

Figure 1:
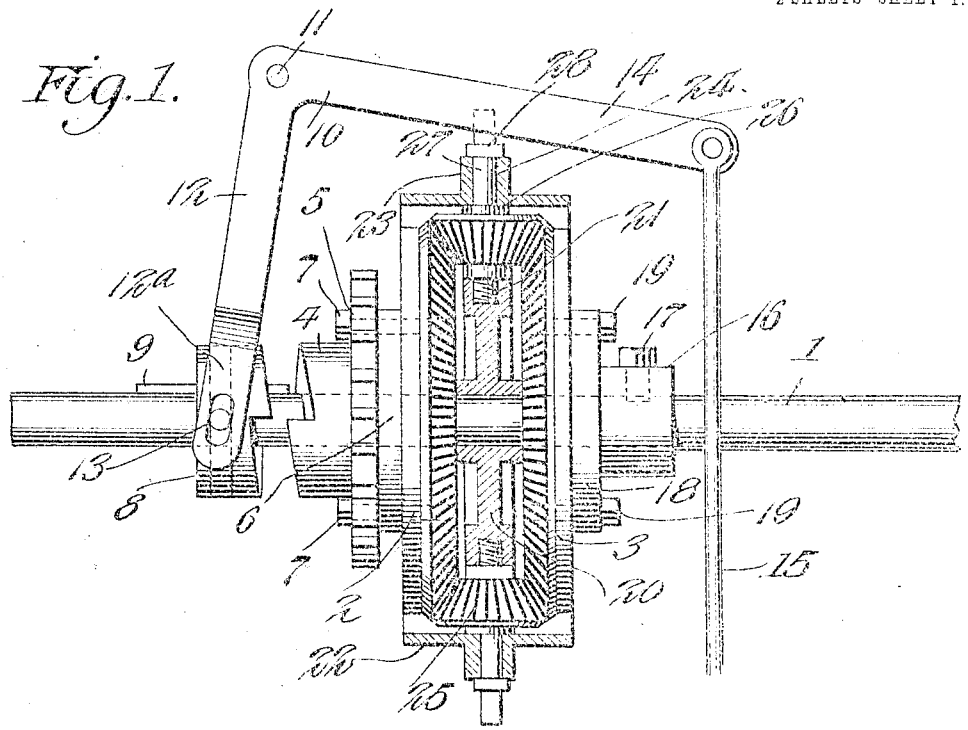
Figure 2:
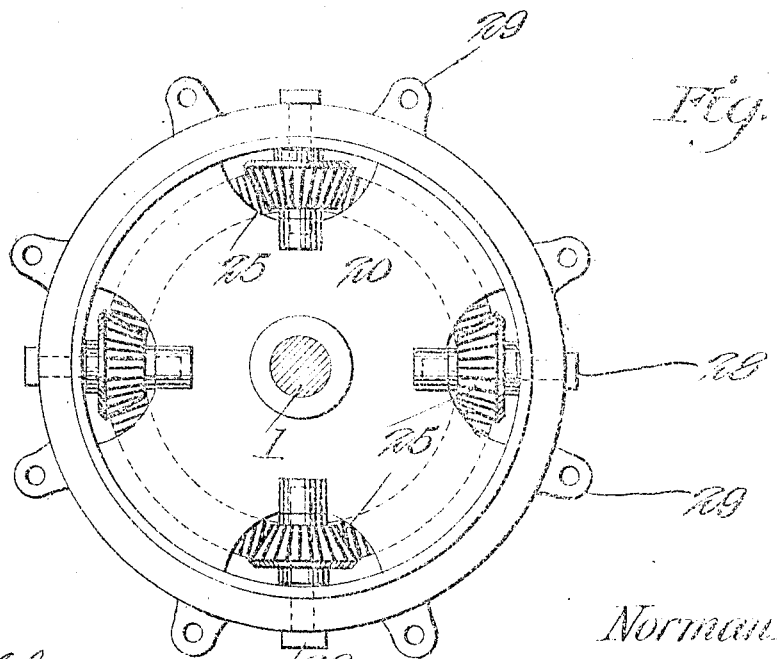

Figure 1 is a view in elevation, partially in section, of a gearing embodying my invention as adapted for use as a reversible drive gearing. Fig. 2 is a cross-section through the driven shaft, showing the gearing in side elevation with the adjusting lever omitted. Fig. 3 is a cross section through the shaft and side elevation of the gearing, showing a modification in the brake mechanism. Fig. 4 is a top plan view of the same. Fig. 5 is a detail of the coupling means between the operating rod and pull rod connected with one of the ends of the brake band.

Referring to the drawing, 1 designates a shaft or axle, on which are mounted counterpart gears 2 and 3, shown in the present instance in the form of bevel gears having their toothed surfaces facing each other. The gear 2 is loosely mounted on the shaft and is fixed to a clutch collar or sleeve 4 and a drive gear 5. As shown, the collar 4 is provided with a flange 6 bearing against the outer side of the gear 2 and against the outer face of which rests the gear 5 which is in the form of a toothed ring, said collar and gear ring being detachably secured to the gear 2 by screws 7 passing through said gear ring and flange and entering threaded openings in the gear 2. The outer side of the collar 4 is provided with beveled or inclined clutch teeth adapted to be engaged by the corresponding teeth of a sliding clutch collar 8 connected by a spline or feather 9 to the shaft so as to be free to slide thereon and fixed to rotate therewith. The collar 8 is adapted to be adjusted through the medium of a bell-crank controlling lever 10 fulcrumed at the angle of intersection of its arms, as at 11, and having one of its arms 12 provided with a forked portion 12ª whose sides or branches are each coupled by a slot and pin connection 13 with the diametrically opposite sides of said sliding collar, and its other arm 14 connected with a suitable operating rod 15.

The gear 3, which loosely engages the shaft, is fixed thereto by a collar or sleeve 16 secured to the shaft by a set screw 17 or other equivalent fastening and provided with a flange 18 bearing against the outer side of the gear and to which the latter is secured by screws 19 corresponding in character with the screws 7. Arranged between the gears 2 and 3 is a transmission mechanism comprising a spider or disk 20 having a hub loosely mounted on the shaft and provided in its periphery with a series of bearing sockets 21 arranged equidistantly around the circumference thereof, and which may vary in number as circumstances require. Surrounding the gears 2 and 3 is a casing, band or shell 22 cast direct to said spider or disk 20 and having an annular flange or rim 23 provided with openings 24. Meshing with the teeth of the gears 2 and 3 are beveled pinions 25 having hollow or tubular hubs 26 journaled on spindles 27, which are in the form of bolts threaded at their inner ends and provided with heads 28 at their outer ends. The pinions are equal in number to the threaded sockets in the disk or spider and the openings 24 in the shell, and rotate loosely on the respective spindles, which are threaded at their inner ends into the sockets 21 and extend through the openings 24 in the shell and have their heads 28 arranged to bear against the periphery of the flange or rim 23. By this construction the pinions are connected with the disk or spider to rotate therewith or independently thereof, while said shell and disk and the pinions are detachably coupled together so that the parts may be conveniently resembled and as conveniently disconnected at any time for repairs and the substitution of new parts. Formed upon the flange 23 at regular intervals is a series of apertured lugs or ears 29, for a purpose hereinafter described. It will be observed that the arm 14 of the lever 10 extends across the outer surface of the shell and is adapted when adjusted to throw the clutch collar 8 out of connection with the clutch collar 4 to lie in the path of the said lugs 29.

Assuming that the gear 5 is driven in any suitable manner from the motor or prime driving element, and constitutes with the gear 2 the driving gear or element of the gearing, it will be understood that when said gears are locked to the shaft by the clutch devices, the gears 2 and 3 will be fixed with relation to each other, and hence that all the gears of the gearing will be locked to each other and to the shaft 1 to transmit motion in a forward direction to said shaft. When the clutch elements 4 and 8 are in engagement, the arm 14 of the lever 10 lies out of the path of movement of the lugs 29, thus allowing the shell, which is then a fixed part of the gearing, to have free and unobstructed movement. When it is desired to reverse the gearing for the purpose of reversing the direction of rotation of the shaft, the rod 15 is operated to throw the arm 14 of the bell crank lever into the path of movement of the lugs 29 of the shell, whereby in such movement the arm 12 of the lever will swing outward, carrying with it the clutch member 8 which will be drawn out of engagement with the clutch member 4, thus unlocking the drive gear from the shaft. Motion of the transmission or differential gear will then be prevented by engagement of one of the lugs 29 with the lever arm 14, and hence as the driving gear continues to rotate forward the spindles 25 will be rotated on their axes and thereby transmit reverse motion to the driven gear 2 and shaft 1, which will accordingly be rotated rearwardly without changing the continuous forward motion of the driving element. When the controlling lever is swung in the opposite direction, the movement of the arm 14 out of the path of the engaged lug 29 will free the transmission gear as a whole for rotary movement with the shaft, while the arm 12 of the lever will be swung inward to bring the clutch members into engagement, whereby all the gears will again be locked together to rotate the same in a forward direction.

It will thus be seen that the gearing constructed and applied as described may be arranged to rotate the driven element forwardly through a corresponding motion of the driving element and to reverse the direction of motion of the driven element without reversing the direction of motion of the driving element. Of course, it will be understood that the shaft or gear 3 may be suitably driven from the source of power and constitute the driving element to operate another part coupled to the gear 5, which, in this event, will constitute, with the gear 2, the driven element. The operation in this mode of use of the gearing in securing a reversal of motion of the driven element without reversing the direction of motion of the driving element will be apparent.

While the controlling lever is designed to simultaneously couple the gear 2 to the shaft and lock the differential gear as a whole against rotation bodily with the shaft, and for simultaneously freeing said differential gear and locking the driving gear to the shaft, it will be understood that different means may be employed in conjunction with the lever for this purpose—that is to say, that instead of employing the lugs 29 to engage the arm 14 of the lever, any suitable means, such as a band brake or other equivalent device, directly or indirectly operated or controlled by the lever may be employed to control the differential gear in the manner described. In Figs. 3, 4 and 5 I have shown a band-brake mechanism for this purpose. This brake mechanism comprises a pair of friction bands 31 engaging the periphery of the shell on opposite sides of the flange 23, each band being pivotally connected at one end with one of the arms of a bell-crank lever 32 fulcrumed on a suitable pivot bolt, rod or stud 33. On a post 34 is fulcrumed the bell-crank lever 10 which is pivoted at the angle of intersection of its arms 11 and 12 on a pivot screw 11ª carried by said post. The arm 12 is constructed and connected with the sliding clutch collar in the manner shown and described with reference to Figs. 1 and 2. The opposite ends of the brake bands are pivotally connected with the other arm of the bell-crank lever 32 from which extends a rod 35, which is fastened to the rod 15 by a clip or coupling 36. It will be apparent from this construction that when the rod 15 is moved in one direction the clutch collar 4 will be retracted and the brake applied to lock the shell from movement, thus reversing the direction of movement of the shaft without reversing the direction of movement of the drive gear. On the other hand when the rod 15 is moved in the opposite direction the clutch collar will be projected to lock the drive gear to the shaft and the brake will be loosened to free the shell, thus causing all the parts of the gearing to be locked from independent movement, so that they will turn forwardly with the drive gear and shaft.

Having thus fully described the invention, what is claimed as new is:—

1. In a drive gearing, the combination of a shaft, a drive gear, a driven gear, a collar loosely mounted on the shaft and detachably connected with the drive gear and provided with a clutch member, a second collar detachably fastened to the shaft and the driven gear, a frame loosely mounted on the shaft, transmission pinions carried by said frame and meshing with said drive and driven gears, a clutch member on the shaft movable into and out of engagement with the first named clutch member, and a brake mechanism, including a bell crank lever, for operating the movable clutch member, said mechanism being movable in one direction to throw said clutch member out of action and hold the frame from movement and in the reverse direction for throwing said clutch member into action and releasing the frame.

2. In a drive gearing, the combination of a shaft, a drive gear loosely mounted on the shaft, a driven gear fixed to the shaft, a clutch for throwing the drive gear into and out of connection with the shaft, a frame revolubly mounted directly on the shaft between said gears, transmission pinions carried by said frame and meshing with the gears, and a controlling mechanism including a bell crank lever movable in one direction to throw the clutch out of action and to hold the frame from movement, and in the reverse direction to release the frame and throw the clutch into action.

3. In a drive gearing, the combination of a shaft, drive and driven gears loosely mounted on the shaft, a collar detachably secured to the shaft and driven gear and fixing the latter to the shaft, a collar detachably secured to the drive gear and provided with a gear member and a clutch member, a sliding clutch member on the shaft and movable into and out of engagement with the clutch member of the drive gear, a frame revolubly mounted on the shaft between the gears, pinions carried by the frame and meshing with the gears, and a controlling mechanism for holding and releasing said frame from and for movement, said mechanism including a bell crank lever operatively connected with said clutch member, said lever being movable in one direction to project the clutch member and release the frame and in the reverse direction for retracting the clutch member and holding the frame from movement.

4. In a drive gear, the combination of a shaft, drive and driven gears, respectively loose on and fixed to said shaft, clutch mechanism for throwing the drive gear into and out of connection with the shaft, a frame revolubly mounted on the shaft, pinions carried by said frame and meshing with said gears, contact devices on said frame, and a bell crank lever having one of its arms connected with the movable member of the clutch mechanism to project and retract the same and its other arm arranged to coöperate with the said projections on the frame to operate as a brake to hold the frame from movement.

5. In a drive gearing, the combination of a shaft, a driven gear fixed thereto, a drive gear loose thereon, a clutch for throwing the drive gear into and out of connection with the shaft, a transmission mechanism embodying a frame loosely mounted on the shaft and pinions carried thereby and meshing with said drive and driven gears, said frame being provided with peripheral contacts, and a lever connected with the clutch and adapted to engage said contacts, whereby in one movement of the lever the clutch may be opened and the frame engaged to hold the frame against rotary movement, while in the reverse movement of the lever the clutch may be closed and said frame released.

In testimony whereof I affix my signature in presence of two witnesses.

NORMAN FRYE.

Witnesses:
A. E. ACHTERBERG,
GEORGE HAWKINS.